United States Patent
Danilov et al.

(10) Patent No.: US 10,055,145 B1
(45) Date of Patent: Aug. 21, 2018

(54) SYSTEM AND METHOD FOR LOAD BALANCING WITH XOR STAR AND XOR CHAIN

(71) Applicant: EMC IP Holding Company LLC, Hopkinton, MA (US)

(72) Inventors: Mikhail Danilov, Saint Petersburg (RU); Alexander Rakulenko, Seattle, WA (US); Gregory Skripko, Seattle, WA (US); Kirill Zakharov, Saint Petersburg (RU); Andrey Kurilov, Vsevolozhsk (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/581,506

(22) Filed: Apr. 28, 2017

(51) Int. Cl.
  G06F 11/00 (2006.01)
  G06F 3/06 (2006.01)
  G06F 11/14 (2006.01)
  G06F 11/20 (2006.01)

(52) U.S. Cl.
  CPC ............ G06F 3/0617 (2013.01); G06F 3/064 (2013.01); G06F 3/0689 (2013.01); G06F 11/1451 (2013.01); G06F 11/2066 (2013.01)

(58) Field of Classification Search
  None
  See application file for complete search history.

(56) References Cited

U.S. PATENT DOCUMENTS

| | | | | |
|---|---|---|---|---|
| 7,596,570 B1 * | 9/2009 | Emigh | ................ | G06F 11/1453 |
| 2006/0212744 A1 * | 9/2006 | Benner | ............... | G06F 11/1076 714/6.12 |
| 2007/0239952 A1 * | 10/2007 | Hwang | ............... | G06F 11/2058 711/162 |
| 2013/0339295 A1 * | 12/2013 | Dean | ..................... | G06F 3/0611 707/610 |
| 2014/0173235 A1 * | 6/2014 | Molaro | ................. | G06F 3/0619 711/162 |
| 2014/0188825 A1 * | 7/2014 | Muthukkaruppan | | G06F 17/30339 707/694 |
| 2015/0058864 A1 * | 2/2015 | Bourbonnais | ..... | G06F 17/30377 718/105 |
| 2015/0100826 A1 * | 4/2015 | Vujic | .................... | G06F 11/301 714/37 |
| 2017/0177248 A1 * | 6/2017 | Malygin | ............... | G06F 3/0619 |

OTHER PUBLICATIONS

Nguyen et al. (Friendstore: cooperative online backup using trusted nodes) 2008 ACM ISBN 978-1-60558-124-8/08/04, pp. 1-6.*
Zhang et al. (An Optimization Model of Load Balancing in Peer to Peer (P2P) Network: IEEE 978-1-4244-9763-8/11: 2011: pp. 2064-2067.*

* cited by examiner

*Primary Examiner* — Kaushikkumar Patel
(74) *Attorney, Agent, or Firm* — Womble Bond Dickinson (US) LLP (57) ABSTRACT

The disclosure relates to data protection management for geographically distributed storage systems. Specifically, the present disclosure provides a mechanism for load balancing by combining the techniques of XOR Star and XOR Chain to control the protection of data internally. The load balancing is done by each zone without the need for an external load balancer. In addition, the load balancing mechanism provides the ability for native (e.g. without additional configuration) support of disaster recovery.

18 Claims, 8 Drawing Sheets

SYSTEM AND METHOD FOR LOAD BALANCING WITH XOR STAR AND XOR CHAIN

TECHNICAL FIELD

Embodiments of the present disclosure relate generally to data protection/management in storage systems. More particularly, embodiments of the disclosure relate to balancing storage loads within a geographically distributed data storage system.

BACKGROUND

In data storage systems space is allocated for storing a primary set of user data. Additional storage space is allocated for providing data protection for the primary set of data. For example, data protection can include generating a backup copy of the primary data. The backup copy provides protection against data loss in the event of primary data failure.

In geographically distributed data storage systems such as "cloud" storage systems, data protection can include replication to generate copies of primary and backup data and stored independently to provide additional protection. As distributed data storage systems grow in size (e.g. hundreds of zones and clusters), there is a need to balance data storage between various zones. Current systems often rely on an external (relative to the distributed data storage system) load balancer. Load balancers, however, often affect write performance when redirecting traffic (e.g. from local zones to remote zones). Accordingly, there is a continued need to provide efficient mechanisms for load balancing in large-scale geographically distributed data storage systems.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The disclosure relates to data protection management for distributed storage systems. Some distributed storage systems (e.g. the Dell EMC® Elastic Cloud Storage (ECSTM) solutions) employ data protection methodologies that minimize capacity overhead while providing robust data protection. For example, rather than relying on a conventional file system, some systems partition disk space into a set of blocks of fixed size called chunks to manage disk capacity. For example, these chunks may range in size from 64 MB to 128 MB (or more). In some implementations, all user data is stored in these chunks and the chunks are shared meaning that one chunk may (and, in most cases, does) contain fragments of several user objects. For example, chunk content may be modified in append-only mode, and when a chunk becomes full, the chunk is sealed (e.g. content of sealed chunks are immutable).

Storing user data in chunks allows the use of other techniques to minimize capacity overhead while providing robust data protection. For example, for geographically distributed storage, systems may provide additional protection of user data with geo-replication (e.g. "GEO" data protection), in which replication is performed at the chunk level and geographically distributed. In some implementations of geo-replication, systems may not necessarily employ traditional data protection schemes like mirroring or parity protection. Instead, to address the challenges of reducing the capacity overhead associated with data protection while improving the ability to recover from complex failures of storage infrastructure, some distributed data storage systems implement an XOR (eXclusive OR) technique.

As further described herein, embodiments of the present disclosure provide a mechanism for load balancing for a geographically distributed storage system. The mechanism may combine the techniques of XOR Star and XOR Chain as further described herein to balance loads internally by controlling data protection. In addition, the mechanism may provide the ability for native support of disaster recovery (e.g. without the need for an additional configuration).

Figure 1:
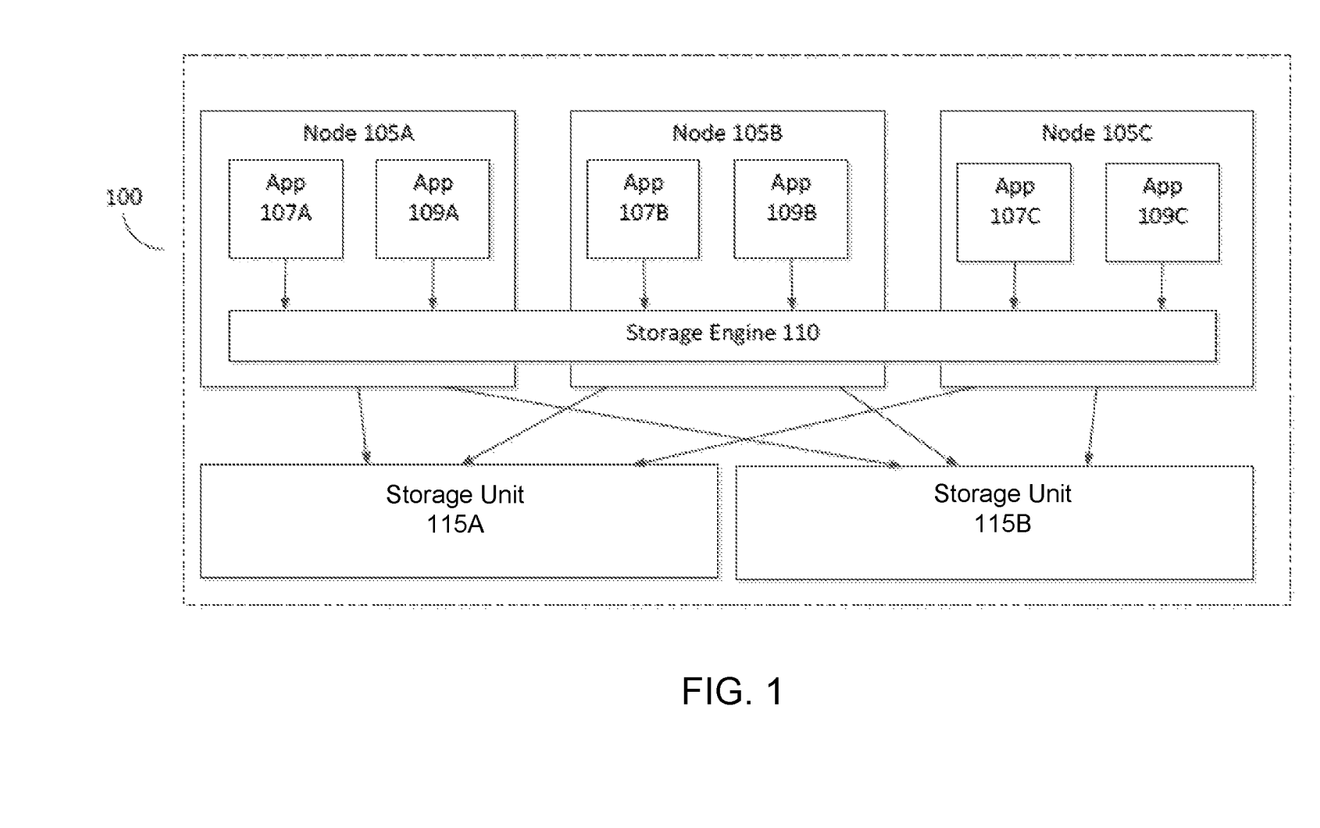
FIG. 1 is a block diagram illustrating an overview of an operating environment of a distributed data storage system according to one embodiment of the disclosure.

FIG. 1 illustrates an overview of an operating environment of a distributed data storage system according to one embodiment of the disclosure.

As shown, distributed data storage system 100 includes one or more storage nodes (105A-C, 105 generally), which may include (or connect to) one or more storage units (115A/B, 115 generally). In one embodiment, a node 105 may be a logical unit that may include one or more storage units 115. Storage units 115 may be any suitable storage device for storing data. For example, the storage units 115 may include magnetic disks, solid state disks, optical disks such as CD-ROM or DVD based storage, magnetic tape storage, magneto-optical (MO) storage media, flash memory based devices, or any other type of non-volatile storage devices suitable for storing large volumes of data. Storage units 115 may also be combinations of such devices. In the case of disk storage media, storage units 115 may be organized into one or more volumes of Redundant Array of Inexpensive Disks (RAID). For example, in one embodiment, the system may use RAID-5 (e.g. using XOR encoding) and/or RAID-6 (e.g. Reed-Solomon).

In one embodiment, storage engine 110 may be executed on one or more nodes 105. In one embodiment, storage engine 110 enables applications 107A, 109A, 107B, 109B, 107C, 109C to execute data I/O requests to and from distributed data storage system 100. In various embodiments, a distributed data storage system may include one or more zones or cluster of nodes 105 that may be located in one or more locations. In one embodiment, the distributed data storage system 100 may be part of a cloud-based data storage system. In one embodiment, the distributed data storage system may partition disk space (e.g. storage space) into a set of blocks of fixed size called chunks.

Figure 2:
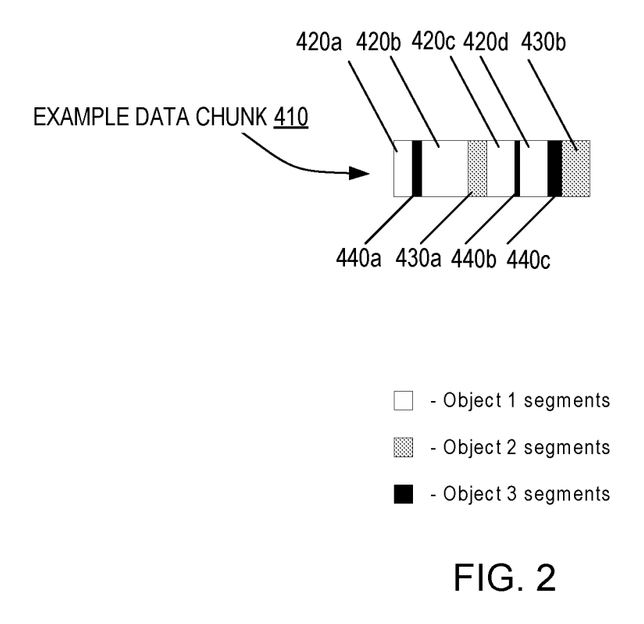
FIG. 2 is a block diagram illustrating an example of a data chunk used in conjunction with one or more embodiments of a distributed data storage system as described herein.

FIG. 2 is a block diagram illustrating an example of a data chunk that may be used in conjunction with one or more embodiments of a data storage system as described herein. In one embodiment, a chunk 410 may contain mixed segments of several user data objects. As shown, chunk 410 may contain segments 420a, 420b, 420c, 420d that belong to Object 1, segments 430a, 430b that belong to Object 2, and segments 440a, 440b, 440c that belong to Object 3. A user data object may be stored as a set of segments that reside in several chunks. In addition, chunk content may be modified in append-only mode, and when a chunk becomes full, the chunk may be sealed (e.g. content of sealed chunks is immutable). As described herein, data chunks may be protected with erasure coding, and may be recovered using the mechanisms described herein.

As described, in one embodiment, the data storage system may support geographically distributed setups including two or more zones (or clusters). For example, GEO-replication may be used to provide an additional protection of user data. In one embodiment, a distributed data storage system may implement an XOR (eXclusive OR) technique to minimize capacity overhead associated with this additional data protection.

The mechanism for load balancing (and recovery) as described herein, may include an XOR Star implementation. With an XOR Star implementation, a target zone receives a replicated chunk (e.g. backup copy) from one or more other zones (e.g. via an incoming star configuration), and the target zone creates and stores an XOR chunk from the received replicated chunks (e.g. received backup copies). In addition, the mechanism may also include an XOR chain implementation. With an XOR chain implementation, a first zone uses its own chunk and a replicated chunk (e.g. backup copy of a chunk) from a second zone to create a combined XOR chunk to be stored to a third zone. For example, an XOR chain implementation may be used to support disaster recovery.

The system may allocate data based on each zone (e.g. cluster of nodes or storage units) alternating between a default mode (e.g. first mode, or XOR Star implementation) and a rebalancing mode (e.g. second mode, or XOR Chain implementation). In one embodiment, when operating in a default mode, a zone may replicate one or more of its chunks to a target zone. In one embodiment, a zone may select the target zone using a particular policy. For example, the policy may include a round-robin policy. The policy may consider various characteristics such as bandwidth, distance, load, etc. In addition, when operating in a default mode, a zone may use XOR Star operations. Accordingly, the XOR Star technique may include a target zone create an XOR chunk from the replicated chunks received from other zones to store them locally.

In one embodiment, a zone (or each zone) may monitor the load of one or more other zones (e.g. target zone). Accordingly, when a zone detects a load imbalance, the zone may switch to the rebalancing mode (or XOR Chain implementation). In one embodiment, each zone may independently monitor for the detection of a load imbalance. In one embodiment, a zone may be considered imbalanced when the zone cannot create a complete XOR chunk for received replicated chunks because there are not enough replicated chunks from the one or more other zones (e.g. remote zones). Accordingly, an imbalance may indicate that some zones are producing a sufficient number of chunks while other zones are producing fewer chunks. Accordingly, in one embodiment, hysteresis may be used as a criterion for foregoing the switch of operating modes from default to rebalancing when the imbalance is not significant. In one embodiment, the system may consider an imbalance insignificant when it is below a predetermined threshold. In one embodiment, when a zone detects a load imbalance, it may switch from a default operating mode to the rebalancing operating mode In one embodiment, when operating in a rebalancing mode, a zone may use an XOR chain technique. Accordingly, the zone may create a partial XOR chunk (e.g. when the imbalance occurs from two or more zones being under loaded), or create a complete XOR chunk (e.g. when one zone is under-loaded). When performing the XOR chain operation, the zone performs an operation with its own chunks and replicated chunks (e.g. backup copy chunks) received from remote zones. The zone may then replicate the resulting XOR chunk to one of the under-loaded zones. If there are two or more under-loaded zones, the local zone may select a replication target zone using any applicable policy (e.g. round-robin policy). When the loads amongst the zones are rebalanced, a zone (or each zone) may switch back to the default operating mode.

FIGS. 3-7 illustrate an example of the above-described process of performing a load balancing amongst a set of three zones within a disturbed data storage system.

Figure 3:
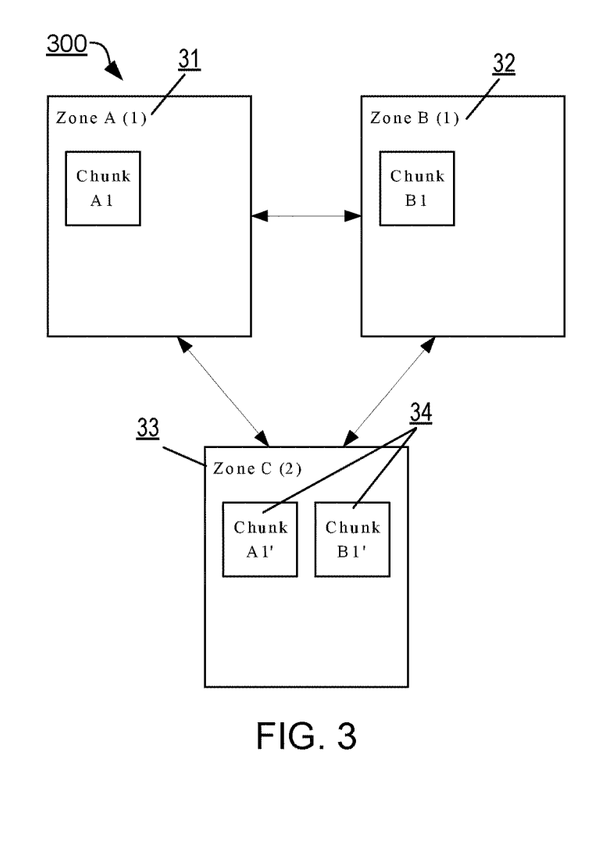
FIGS. 3-7 are block diagrams illustrating an example representation of load balancing chunks of data within a distributed data storage system according to one embodiment of the disclosure.

FIG. 3 is a block diagram 300 illustrating an example of replicating chunks from a local zone to a remote zone according to one embodiment of the disclosure. As shown, there are three zones: Zone A 31, Zone B 32, and Zone C 33. The figure illustrates the system state after Zone A 31 creates (or writes) Chunk A1; Zone B 32 creates (writes) Chunk B1; and both chunks are replicated to Zone C 33. As shown, Zone C contains a backup copy 34 of two chunks. In terms of load, Zone A 31, and Zone B 31 are initially loaded equally, and Zone C (prior to receiving the backup chunks) was under-loaded. For example, it may be the case that there are no client data writes to Zone C.

Figure 4:
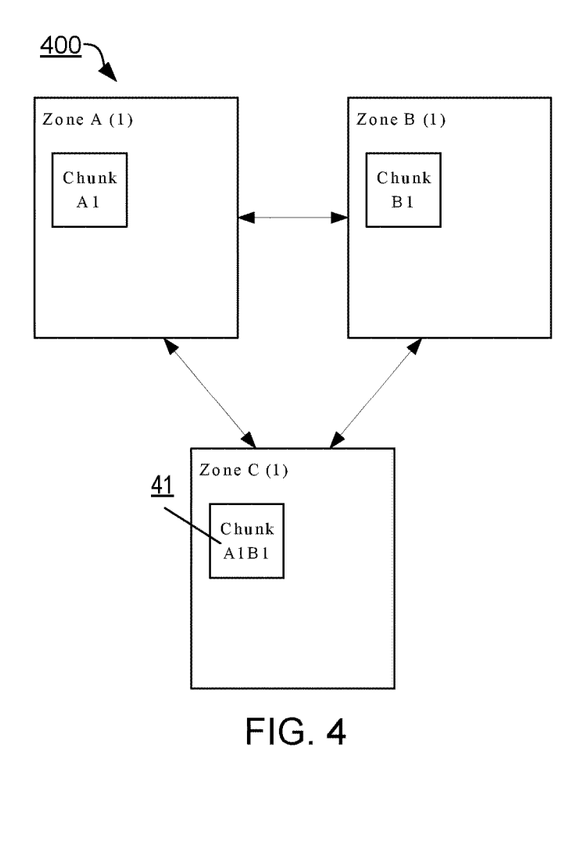

Since Zone C contains a complete set of backup chunks 34, it may operate under a default mode and create an XOR chunk to store locally as shown in the diagram 400 of FIG. 4. As shown, Chunk A1B1 41 is an XOR chunk for Chunk A1 and Chunk B1.

Figure 5:
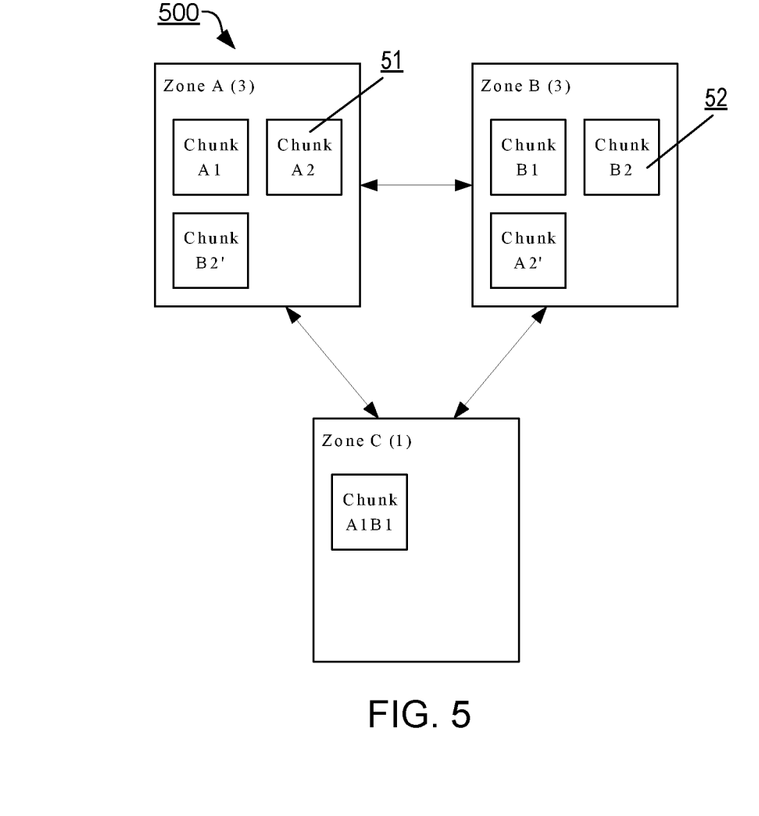

To continue the example, Zone A may next create Chunk A2 51 and, following a round-robin policy, replicate it to Zone B. Zone B produces Chunk B2 52 and, following round-robin policy, replicates it to Zone A as shown in the diagram 500 of FIG. 5. Accordingly, at this moment no XOR chunk can be created as shown in FIG. 5. After some time (e.g. in response to write requests) Zone A and Zone B create two more chunks: Chunk A3 61 and Chunk B3 62, respectively, as shown in the diagram 600 of FIG. 6.

Figure 6:
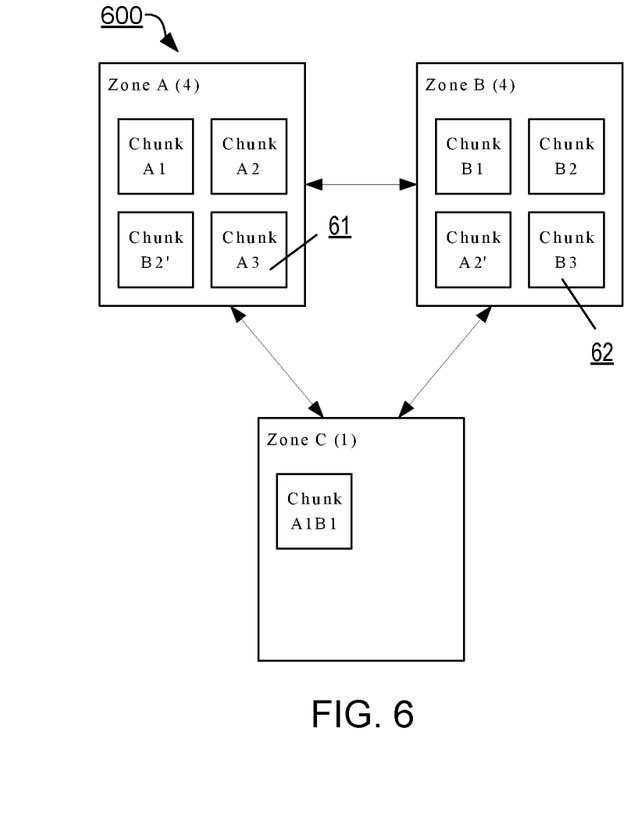
Figure 7:
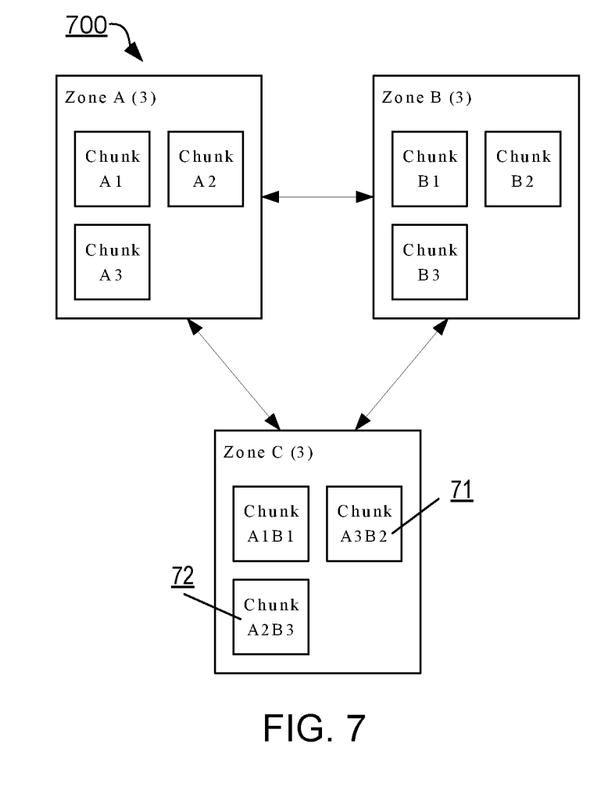

Based on the data loads as shown in FIG. 6, Zone A and Zone B may detect a load imbalance. Particularly, Zone C does not create enough chunks. Accordingly, Zone A and Zone B may switch to the rebalancing mode of operation. Thus, as shown in diagram 700 of FIG. 7, Zone A creates an XOR chunk using the backup copy of Chunk B2 and its Chunk A3, and sends the resultant Chunk A3B2 71 to under-loaded Zone C. Similarly, Zone B creates an XOR chunk using the backup copy of Chunk A2 and its Chunk B3, and sends the resultant Chunk A2B3 72 to under-loaded Zone C.

Accordingly, after completing the process described above, each zone contains three chunks, which was achieved without redirection of user data traffic (e.g. without the need for an external load balancer). As noted above, in one embodiment, all zones may act independently and without centralized coordination. Accordingly, each zone is capable of defining its operating mode based on its own information.

Figure 8:
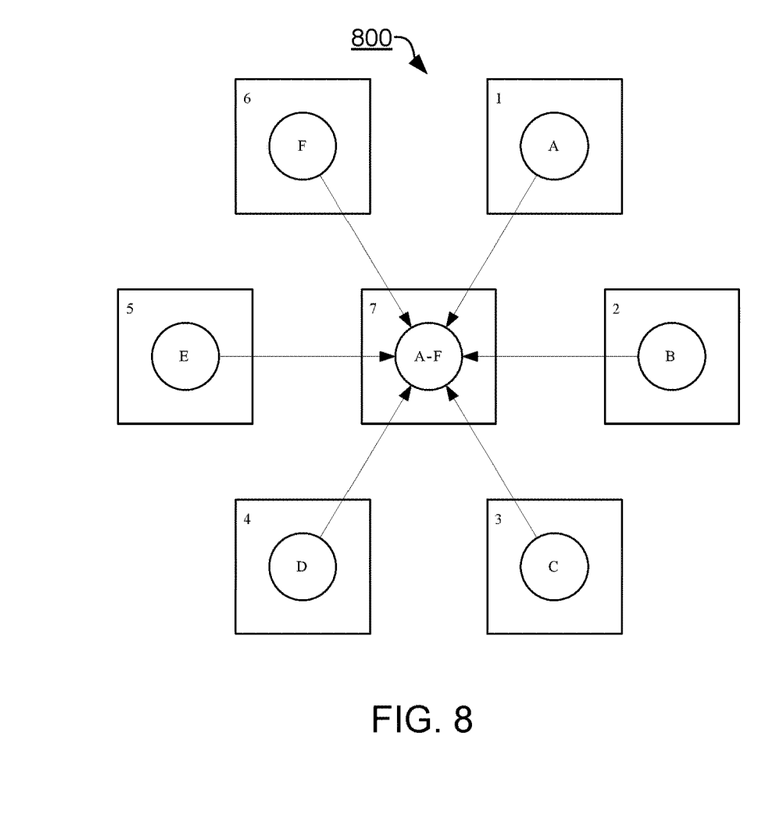
FIGS. 8-9 are block diagrams illustrating an example representation of performing a load balancing within a distributed data storage system with 6 frontend zones and 1 backend zone according to one embodiment of the disclosure.
Figure 9:
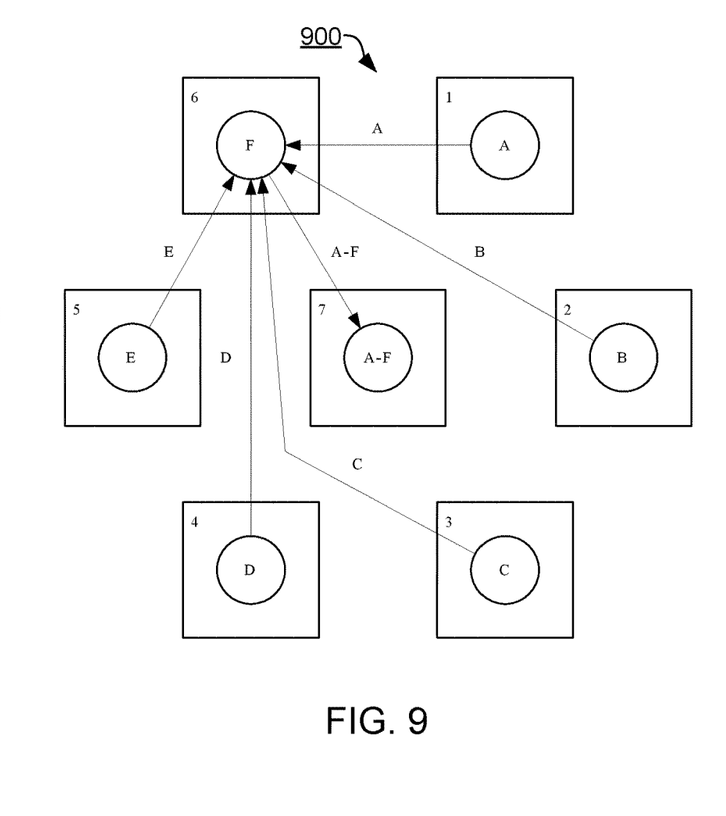

As an extension of the example above, FIGS. 8-9 are block diagrams illustrating an example representation of performing a load balancing to support disaster recovery within a distributed data storage system. In one embodiment, the mechanism provides native support for disaster recovery. For example, native support refers to the concept that the replication provides a disaster recovery configuration without the need for an additional configuration. For instance, it is not necessary to assign an explicit role (e.g. frontend or backend) to a zone. Such is the case because all complete XOR chunks end up in a backend zone automatically as described below.

To achieve native support for disaster recovery, the zones simply follow the operating modes described above. For example, as shown in diagram 800 of FIG. 8, the configuration may include six frontend zones (e.g. Zones 1-6) and one backend zone (e.g. Zone 7). As described above, the system may use a round-robin policy to choose a target zone for replication of a chunk. As described above, the system may use two methods to produce XOR chunks (e.g. XOR Star and XOR Chain). For example, each sixth XOR chunk may be created by the backend zone using a pure XOR star technique as shown in FIG. 8.

However, most XOR chunks (e.g. five out of the six) are created by zones that operate under rebalancing mode. For example, Zones 1-6 detect a load imbalance because Zone 7 produces no chunks as shown in FIG. 9. Accordingly, when a configuration includes more than three zones, aspects of both XOR Star and XOR Chain may be used to create an XOR chunk. As shown in FIG. 9, Zone 6 uses an XOR Star operation to create a partial XOR chunk for chunks from A to E. Then Zone 6 may perform an XOR Chain operation to chain its chunk F to the partial XOR chunk to create a complete XOR chunk A-F. The XOR chunk of A-F may then be sent to Zone 7.

Accordingly, the mechanism described herein provides an efficient technique for load balancing in a geographically distributed data storage system. As described above, the system may provide load balancing without redirecting user traffic to remote zones. Accordingly, the system does not incur a penalty for write operations that may occur when such redirection is required (e.g. via an external load balancer). In addition, the system may perform load balancing without complex coordination between geographically distributed zones. For example, in one embodiment, each zone may select its operating mode independently. Moreover, the system supports disaster recovery without the need for an additional system configuration as all complete XOR chunks end up in a backup zone automatically.

Figure 10:
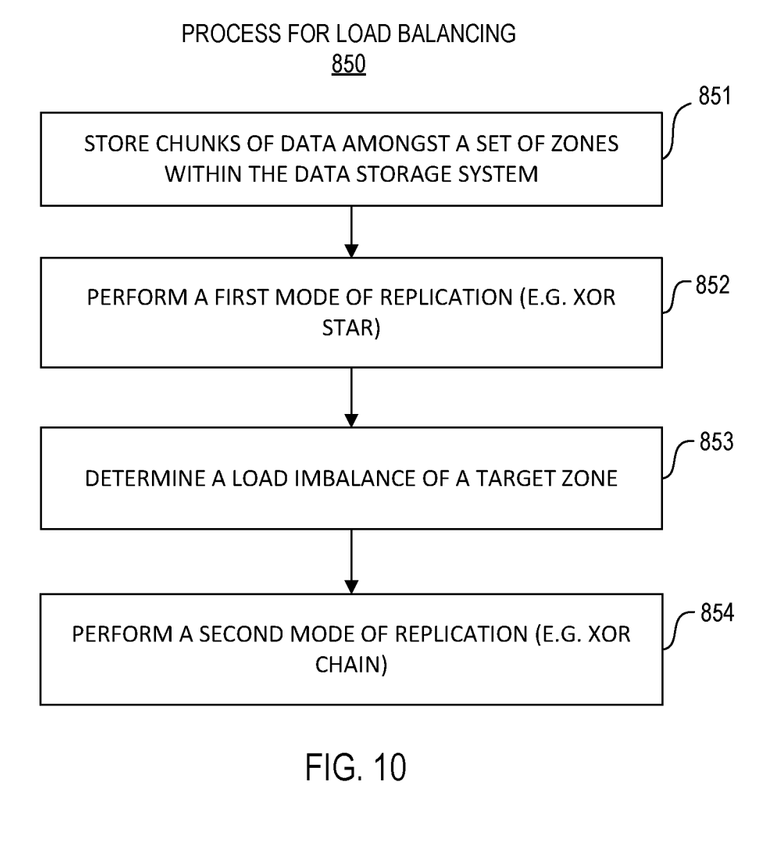
FIG. 10 is an example flow diagram of a process for load balancing according to one embodiment of the disclosure.

FIG. 10 is an example flow diagram illustrating a method of performing load balancing according to an embodiment of the disclosure. Process 850 may use processing logic, which may include software, hardware, or a combination thereof. For example, process 850 may be performed by one or more components of a system (e.g. a zone, system 100, storage engine 110, one or more nodes 105, etc.).

In 851, the process may include storing chunks of data amongst a set of zones (e.g. Zones A-C, or Zones 1-7 as described above) within the geographically distributed data storage system.

In 852, the process may include performing, by at least a first and second zone, a first mode of replication (e.g. default mode, or XOR Star). In one embodiment, the first mode of replication may include selecting a first remote zone based on a policy. For example, the policy may include a round-robin policy. In one embodiment, the first mode of replication may include replicating one of its own chunks to the first remote zone, wherein the first remote zone creates a first XOR chunk to store locally from the replicated chunks received from the first and second zones (see e.g. FIGS. 3-4). In one embodiment, selecting the first remote zone may be performed individually by the first and second zones and without coordination from an external load balancer.

In 853, the process may include determining, by the first or second zone, a load imbalance of a target zone (see e.g. FIG. 6).

In 854, the process may include performing, by the first or second zone, a second mode of replication (e.g. rebalancing mode, or XOR Chain). In one embodiment, the second mode of replication may include creating a second XOR chunk from one of its own chunks and a replicated chunk received from a second remote zone (see e.g. chunks 71 and 72 of FIG. 7). In addition, in one embodiment, the second mode of replication may include replicating the second XOR chunk to the target zone to rebalance a load amongst the set of zones (see e.g. FIG. 7). In one embodiment, creating the second XOR chunk includes creating a partial XOR chunk when the load imbalance includes at least two target zones.

In one embodiment, performing (or switching) to the second mode of replication may be performed in response to determining the load imbalance. In one embodiment, the process may further include determining, by the first or second zone, a load rebalance of the target zone, and in response, switching back to the first mode of replication.

It should be noted that there may be variations to the flow diagrams or operations (or steps) described therein without departing from the embodiments described herein. For example, the operations may be performed in parallel, simultaneously, a differing order, or operations may be added, deleted, or modified.

Figure 11:
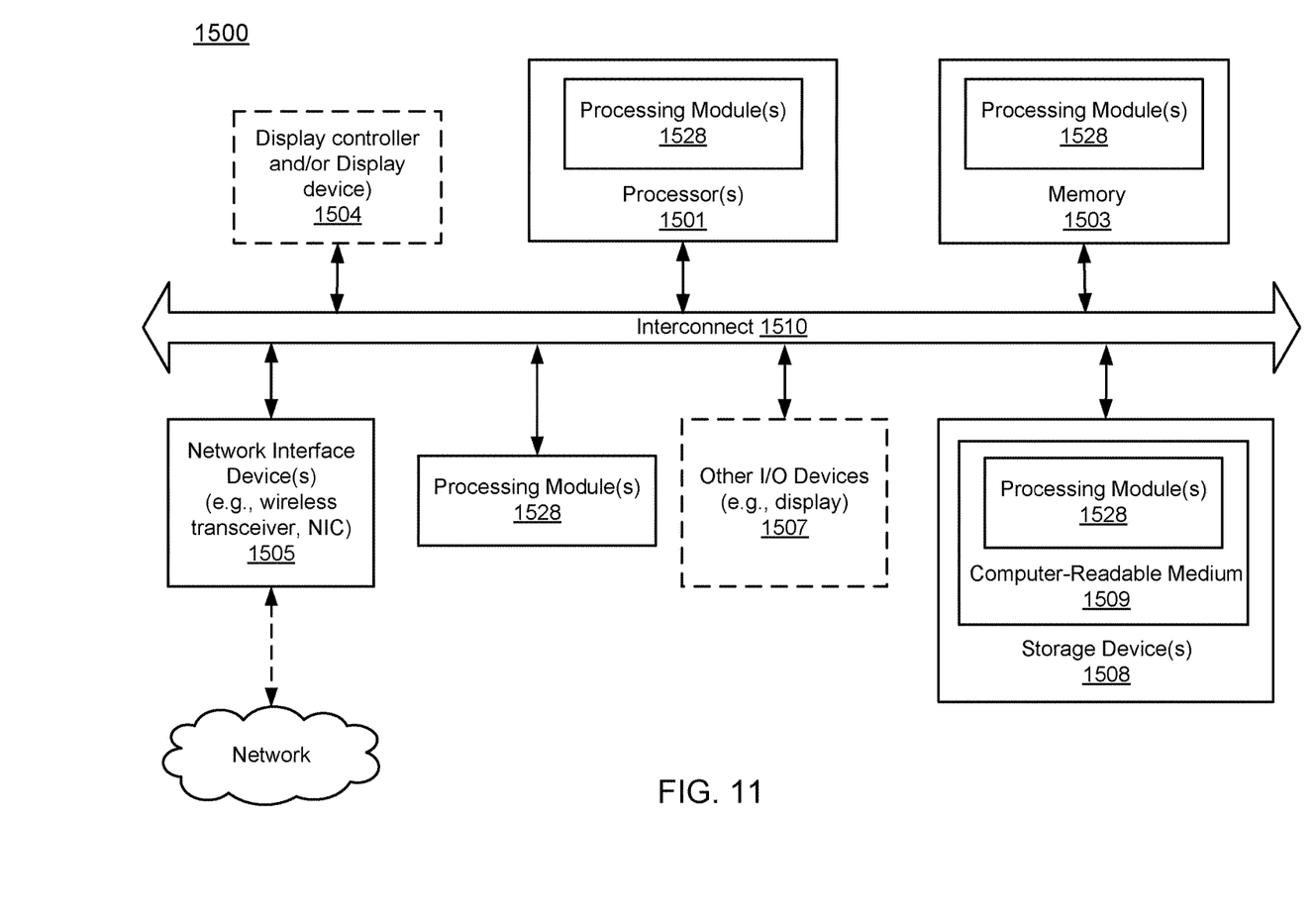
FIG. 11 is a block diagram illustrating an example computing system that may be used in conjunction with one or more embodiments of the disclosure.

FIG. 11 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. system 100, storage engine 110, nodes 105, storage unit 115, zone, etc.). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

IO devices 1507 may include various electronic displays (e.g., a monitor having a screen, a small LCD touch-screen or any other electrical device that is operable to display information), audio output (such as speakers).

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. storage engine 110, applications 107-109, nodes 105) etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of performing load balancing within a data storage system, comprising:
   storing chunks of data amongst a set of zones within the data storage system;
   performing, by at least a first and second zone, a first mode of replication, wherein the first mode of replication includes
   selecting a first remote zone based on a policy, and
   replicating one of its own chunks to the first remote zone, wherein the first remote zone creates a first XOR chunk to store locally from the replicated chunks received from the first and second zones;
   determining, by the first or second zone, a load imbalance of a target zone; and
   in response to determining the load imbalance, performing, by the first or second zone, a second mode of replication, wherein the second mode of replication includes
   creating a second XOR chunk from one of its own chunks and a replicated chunk received from a second remote zone, and
   replicating the second XOR chunk to the target zone to rebalance a load amongst the set of zones.

2. The method of claim 1, further comprising determining, by the first or second zone, a load rebalance of the target zone, and in response, switching back to the first mode of replication.

3. The method of claim 1, wherein creating the second XOR chunk includes creating a partial XOR chunk when the load imbalance includes at least two target zones.

4. The method of claim 1, wherein performing the first mode of replication is repeated by the first and second zones until the load imbalance is determined.

5. The method of claim 1, wherein the policy for selecting the first remote zone is a round-robin policy.

6. The method of claim 1, wherein selecting the first remote zone is performed individually by the first and second zones and without coordination from an external load balancer.

7. A data storage system, comprising:
   a memory storing instructions; and
   one or more processors coupled to the memory to execute the instructions from the memory, the one or more processors being configured to perform operations, the operations comprising:

storing chunks of data amongst a set of zones within the data storage system;

performing, by at least a first and second zone, a first mode of replication, wherein the first mode of replication includes selecting a first remote zone based on a policy, and replicating one of its own chunks to the first remote zone, wherein the first remote zone creates a first XOR chunk to store locally from the replicated chunks received from the first and second zones;

determining, by the first or second zone, a load imbalance of a target zone; and in response to determining the load imbalance, performing, by the first or second zone, a second mode of replication, wherein the second mode of replication includes creating a second XOR chunk from one of its own chunks and a replicated chunk received from a second remote zone, and replicating the second XOR chunk to the target zone to rebalance a load amongst the set of zones.

8. The system of claim 7, the operations further comprising determining, by the first or second zone, a load rebalance of the target zone, and in response, switching back to the first mode of replication.

9. The system of claim 7, wherein creating the second XOR chunk includes creating a partial XOR chunk when the load imbalance includes at least two target zones.

10. The system of claim 7, wherein performing the first mode of replication is repeated by the first and second zones until the load imbalance is determined.

11. The system of claim 7, wherein the policy for selecting the first remote zone is a round-robin policy.

12. The system of claim 7, wherein selecting the first remote zone is performed individually by the first and second zones and without coordination from an external load balancer.

13. A non-transitory machine-readable medium storing instructions which, when executed by one or more processors of a computing device, cause the computing device to perform operations comprising:

storing chunks of data amongst a set of zones within the data storage system;

performing, by at least a first and second zone, a first mode of replication, wherein the first mode of replication includes selecting a first remote zone based on a policy, and replicating one of its own chunks to the first remote zone, wherein the first remote zone creates a first XOR chunk to store locally from the replicated chunks received from the first and second zones;

determining, by the first or second zone, a load imbalance of a target zone; and in response to determining the load imbalance, performing, by the first or second zone, a second mode of replication, wherein the second mode of replication includes creating a second XOR chunk from one of its own chunks and a replicated chunk received from a second remote zone, and replicating the second XOR chunk to the target zone to rebalance a load amongst the set of zones.

14. The medium of claim 13, further comprising determining, by the first or second zone, a load rebalance of the target zone, and in response, switching back to the first mode of replication.

15. The medium of claim 13, wherein creating the second XOR chunk includes creating a partial XOR chunk when the load imbalance includes at least two target zones.

16. The medium of claim 13, wherein performing the first mode of replication is repeated by the first and second zones until the load imbalance is determined.

17. The medium of claim 13, wherein the policy for selecting the first remote zone is a round-robin policy.

18. The medium of claim 13, wherein selecting the first remote zone is performed individually by the first and second zones and without coordination from an external load balancer.

* * * * *